(12) United States Patent
Durchman

(10) Patent No.: US 11,937,536 B1
(45) Date of Patent: Mar. 26, 2024

(54) LAWN MOWER DECK CLEANING APPARATUS AND METHOD

(71) Applicant: David Jerome Durchman, Newport, MI (US)

(72) Inventor: David Jerome Durchman, Newport, MI (US)

( * ) Notice: Subject to any disclaimer, the term of this patent is extended or adjusted under 35 U.S.C. 154(b) by 0 days.

(21) Appl. No.: 18/382,000

(22) Filed: Oct. 19, 2023

(51) Int. Cl.
*A01D 34/00* (2006.01)
*A01D 34/81* (2006.01)
*A01D 101/00* (2006.01)

(52) U.S. Cl.
CPC .......... *A01D 34/003* (2013.01); *A01D 34/81* (2013.01); *A01D 2101/00* (2013.01)

(58) Field of Classification Search
CPC .................................................. A01D 34/003
See application file for complete search history.

(56) References Cited

U.S. PATENT DOCUMENTS

| | | | | |
|---|---|---|---|---|
| 2,823,508 A * | 2/1958 | Brown | ................. | A01D 34/003 56/230.2 |
| 2,966,023 A * | 12/1960 | Carpenter | ............... | A01D 43/14 56/16.8 |
| 3,043,482 A * | 7/1962 | Laughlin | ................ | A01D 43/14 222/161 |
| 3,070,941 A * | 1/1963 | Sheppard | ............... | A01D 34/63 15/79.2 |
| 3,359,710 A * | 12/1967 | Anderson | ............... | A01D 43/14 56/16.8 |
| 3,375,644 A * | 4/1968 | Harper | .................... | A01D 43/14 56/16.8 |
| 3,477,212 A * | 11/1969 | Coffman | ................ | A01D 43/14 56/16.8 |
| 3,959,955 A * | 6/1976 | Smith | ..................... | A01D 34/84 D15/17 |
| 4,901,509 A * | 2/1990 | Leuz | ..................... | A01D 42/005 56/16.9 |
| 5,189,869 A * | 3/1993 | McBride | .............. | A01D 34/003 56/320.1 |
| 6,539,694 B2 * | 4/2003 | Oxley | .................. | A01D 34/003 56/16.7 |
| 11,172,606 B2 * | 11/2021 | Levin | .................... | A01D 34/008 |
| 11,647,690 B2 * | 5/2023 | Kim | ..................... | A01D 34/003 56/12.1 |
| 2004/0148852 A1 * | 8/2004 | Musak | ................ | A01G 27/006 47/40.5 |
| 2012/0055130 A1 * | 3/2012 | Au | ....................... | A01C 17/001 56/16.8 |

FOREIGN PATENT DOCUMENTS

GB     2085852 A  *  5/1982   ............ A01D 43/14

* cited by examiner

*Primary Examiner* — Alicia Torres
(74) *Attorney, Agent, or Firm* — Heed Low Group; Thomas P. Heed

(57) ABSTRACT

A lawn mower deck cleaning apparatus and method are disclosed. The cleaning apparatus has a gravity-fed dispenser assembly that delivers ice discretely through an aperture in the lawn mower deck. The ice impacts the lawn mower blade and a plurality of slingers, which pulverize the ice, causing it to ricochet against the interior surfaces of the lawn mower deck, thereby removing debris.

13 Claims, 3 Drawing Sheets

US 11,937,536 B1

LAWN MOWER DECK CLEANING APPARATUS AND METHOD

FIELD OF INVENTION

This invention relates to the classification of Harvesting; Mowing; and and to one or more sub-classifications for Mowers. Specifically, the present invention relates to a new apparatus and method for cleaning the underside of a lawn mower deck while it is in use.

BACKGROUND OF INVENTION

Lawn mower decks house a spinning mower blade and direct clippings and debris to a desired outlet or receptacle. It is common for mower decks to develop of a layer of clippings along the interior surface thereof, whereby lawn clippings and debris are thrown against the interior of the mower deck and often become caught therein. This is particularly true if the clippings are moist. While this is a common occurrence, allowing a mower deck to go uncleaned for long periods of time can result in reduced performance and even damage to the mower deck material if not addressed. Further, step stools configured in this manner require a storage space that is at least the size of the step stool. This is not only inconvenient, but may also cause damage to walls, floors, or cabinets where the user chooses to store the step stool. These step stools also require users to grasp the stool with their hands, which is less sanitary, especially in kitchen, bathroom, and restaurant settings. Therefore, there is a need for a step stool that can be quickly stored without taking up unnecessary space and causing damage to its surroundings. There is also a need for a step stool that a user can employ without the use of his or her hands.

Common methods of cleaning the underside of a mower deck include frictionally removing material using a brush or similar implement, as well as using a water hose to dislodge grass and other debris. While this is effective, it requires a separate cleaning process after the lawn mower has been used, adding time to the mowing activity. The present invention provides a new method of cleaning the underside of a mower deck, whereby the user can clean the mower deck while the mower is still operating. The present invention reduces time spent cleaning the mower after mowing an area of grass.

Specifically, the present invention provides a method of cleaning a lawn mower deck using a ice while the lawn mower blade is spinning. The method involves introducing a quantity of ice, and preferably ice, into the mower deck, whereby the mower blade pulverizes the ice and accelerates liquid and solid portions thereof against the interior surfaces of the mower deck to clean the same. The liquid and solid portions act as both a lubricant and abrasive to dislodge ice and clean the interior surface of the mower deck. This causes dirt and clippings to enter the collection bag or otherwise ejected from the mower deck. To facilitate the introduction of solid ice, an elongated conduit and ice hopper is provided, whereby the dispenser connects to the mower deck and can move the cubed ice from the ice container to the interior of the mower deck. Use with both push mower and ride-on mower decks are contemplated.

SUMMARY OF THE INVENTION

This summary is intended to disclose the present invention, a lawn mower deck cleaning apparatus and method. The embodiments and descriptions are used to illustrate the invention and its utility, and are not intended to limit the invention or its use.

In view of the foregoing disadvantages inherent in the known types of cleaning systems now present in the prior art, the present invention provides a new type of mower deck cleaning system that utilizes ice to clean the mower deck interior surfaces while the mower is operating.

It is therefore an object of the present invention to provide a new and improved mower deck cleaning system that has all of the advantages of the prior art and none of the disadvantages.

It is another object of the present invention to provide a mower deck cleaning system that removes dirt, debris, and compacted grass clippings from the interior surfaces of a mower deck without requiring the user to manually remove the same with hand tools or a power washer.

Another object of the present invention is to provide a mower deck cleaning system that can clean the interior surfaces of a mower deck while the lawn mower is in operation and the mower blade is turning, whereby cleaning operations can be commenced at the beginning or end of landscaping duties.

Yet another object of the present invention is to provide a mower deck cleaning system that can be deployed on mower decks of ride-on mowers, push mowers, and even rotary equipment that is not specifically related to cutting grass or landscaping (i.e. other industrial equipment with spinning elements).

Another object of the present invention is to provide a mower deck cleaning system that utilizes ice as a means of lubricating and frictionally removing debris from the interior surfaces of the mower deck, whereby the mower blade accelerates the ice against the interior surfaces as the blade spins, causing portions of the ice to impact the walls and causing the ice to quickly become pulverized into liquid water.

Another object of the present invention is to provide a mower deck cleaning system that comprises an elongated snorkel or conduit that connects to the mower deck, extends upwards, and terminates at an ice hopper, whereby the user can place ice within the hopper to introduce the ice into the mower deck interior space for cleaning purposes.

A final object of the present invention is to provide a mower deck cleaning system that may be readily fabricated from materials that permit relative economy and are commensurate with durability, and one that can be incorporated in new production models of mowers or retrofitted onto existing mower decks currently on the market.

Other objects, features and advantages of the present invention will become apparent from the following detailed description taken in conjunction with the accompanying drawings.

BRIEF DESCRIPTION OF THE DRAWINGS

The present invention, a lawn mower deck cleaning apparatus and method, is illustrated with 3 drawings on 3 sheets.

DETAILED DESCRIPTION OF THE DRAWINGS

Figure 1:
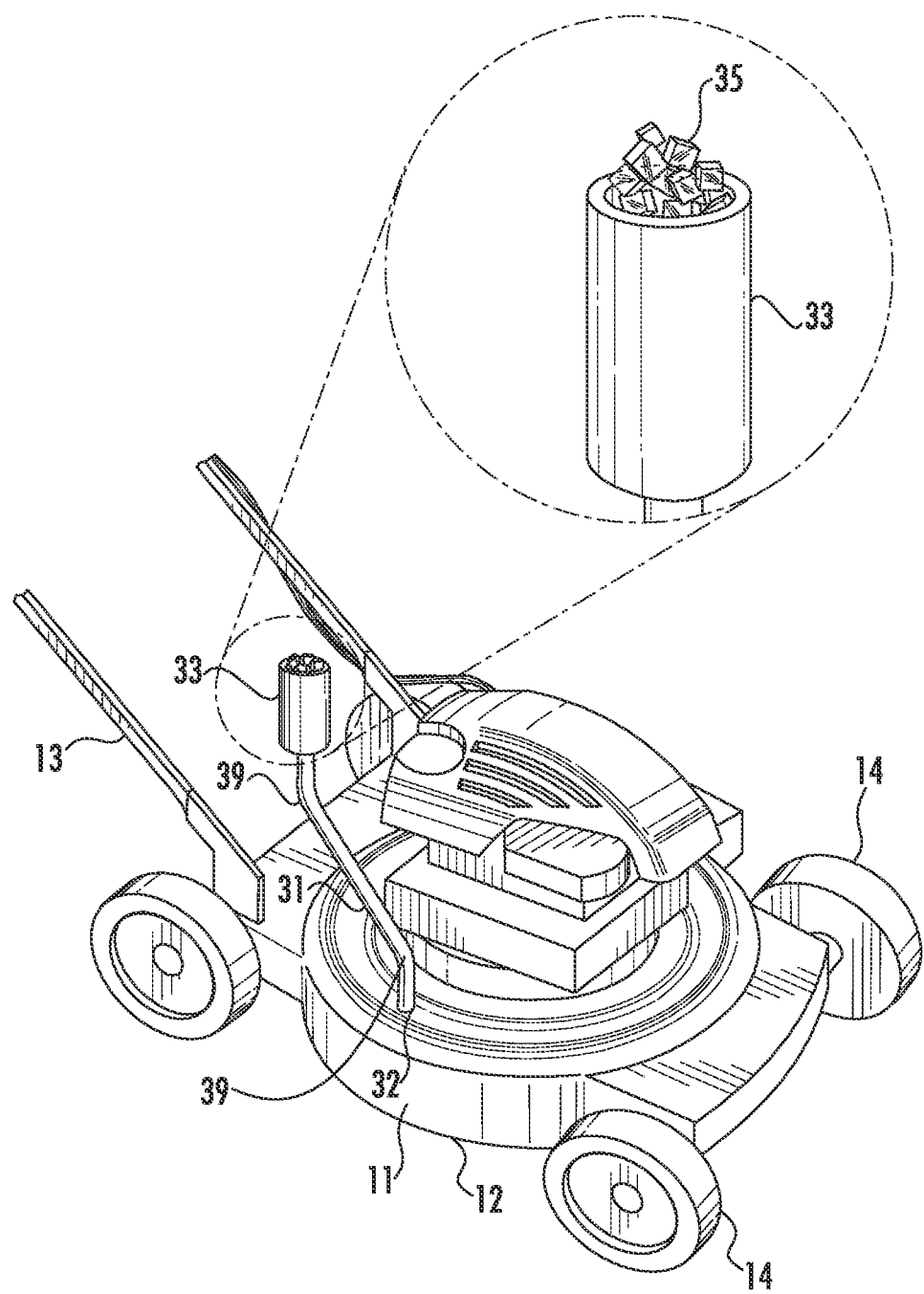
FIG. 1 is an upper perspective view of a standard lawn mower fitted with the present invention.

The following descriptions are not meant to limit the invention, but rather to add to the summary of invention, and illustrate the present invention, by offering and illustrating various embodiments of the present invention, a lawn mower deck cleaning apparatus and method. While embodiments of the invention are illustrated and described, the embodiments herein do not represent all possible forms of the invention. Rather, the descriptions, illustrations, and embodiments are intended to teach and inform one skilled in the art without limiting the scope of the invention.

Certain terminology is used in the following description for convenience only and is not limiting. The article "a" is intended to include one or more items, and where only one item is intended the term "one" or similar language is used. To assist in the description of the present invention, words such as before, after, first, second, near, far, short, long, top, bottom, side, upper, lower, front, rear, inner, outer, right and left are used to describe the relative sequence, order, proximity, size and orientation of aspects of the present invention, a lawn mower deck cleaning apparatus and method. The terminology includes the words above specifically mentioned, derivatives thereof, and words of similar import.

Reference is made herein to the attached drawings. Like reference numerals are used throughout the drawings to depict like or similar elements of the mower deck cleaning system of the present invention. For the purposes of presenting a brief and clear description of the present invention, the preferred embodiment will be discussed as used for cleaning the underside of a mower deck or similar machinery with a spinning element by way of the introduction of ice cubes into the underside of the mower deck, whereby the ice is fractured by the rotating blade. This causes the ice to both frictionally remove debris and introduce water as a lubricate to liberate the same. The figures are intended for representative purposes only and should not be considered to be limiting in any respect.

Figure 2:
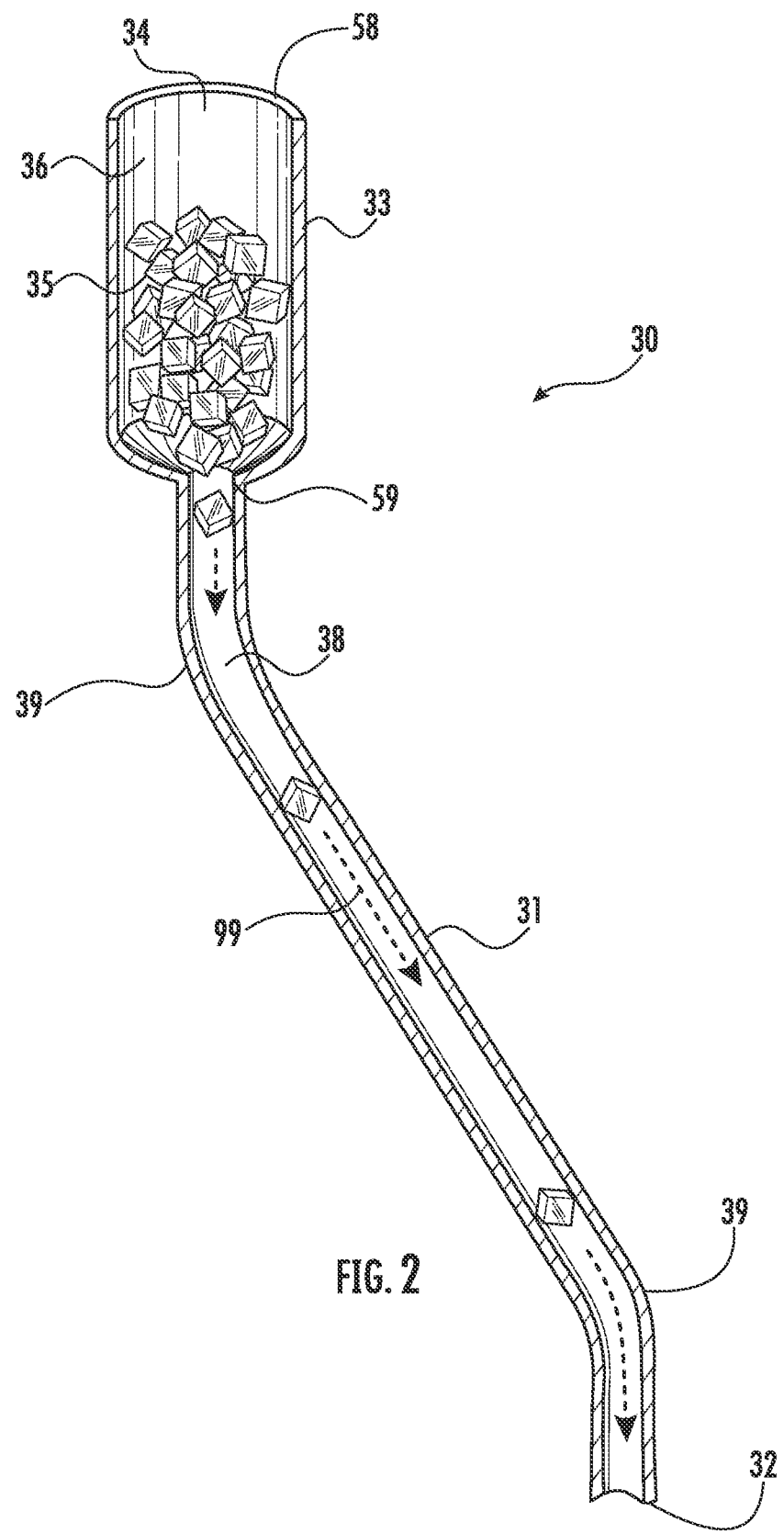
FIG. 2 is a side cut-away of the hopper and conduit of the dispenser.

Referring now to FIGS. 1 and 2, there is shown a view of a first embodiment of the mower deck cleaning system of the present invention. The mower deck cleaning system is one that is configured to remove dirt, debris, and layered clippings from the mower deck interior surfaces that have accumulated thereon during use of the lawnmower. Typical lawn mowers, including push mowers and ride-on mowers, comprise a mower deck 11 having a substantially rounded shape that forms a housing with enclosed sides, an upper surface, and an open lower surface 12. Within the mower deck 11 is a spinning mower blade 15 (shown in FIGS. 3A and 3B) that is used to cut grass to a certain level as the mower passes thereover. For push mowers, the mower deck 11 is supported by a plurality of roller wheels 14 and an engine or motor is used to power the mower blade.

The mower is moved based on the user's motive input into the handle 13. For ride-on mowers, a wheeled vehicle is propelled by an engine or motor, and one or more mower decks are supported thereunder. A user sits or stands on the ride-on mower, whereby the engine or motor directly drives a blade or a pulley or belt system drives the blades of each mower deck.

The mower deck cleaning apparatus of the present invention introduces ice 35 into the mower deck interior to frictionally remove material from the interior surfaces thereof. The ice 35 is introduced into the mower deck interior while the mower blade is spinning, whereby the material contacts the mower blade and is accelerated against the interior walls of the mower deck. The high energy impact of the ice against the walls of the mower deck release built-up debris and clippings therefrom, which fall through the open lower 12 of the mower deck and release from the interior walls. The introduction of ice 35 into the mower deck commences when the mower is operational, either before or after landscaping duties to clean the interior surfaces thereof.

The ice 35 is introduced into the mower deck using a dispenser assembly 30 disposed above the mower deck 11. The ice 35 may be provided in the form of cubed ice 35 traditionally prepared in homes within a freezer, ice 35 chunks commercially purchased, or any other form of ice 35 such that the portions can be individually handed and readily move 99 through the conduit 31. Use of an ice 35 serves dual purposes: the material when contacted by the spinning mower blade is either directly accelerated against the walls of the mower deck or broken into smaller chunks, and the ice becomes pulverized into liquid form to create lubrication within the mower deck interior. The combined effect of ice impacts and introduction of water loosens the material against the interior walls of the mower deck, thereby causes release thereof such that the mower deck is cleaned of debris and potential interferences with the spinning mower blade.

Removal of material also actively prevents corrosion of the mower deck, as the paint or sealant thereover is preserved and not affected by the debris otherwise layered thereon.

The dispenser assembly 30 of the present invention comprises an upstanding conduit 31 that connects to the mower deck 11 at a junction 32 and allows the ice 35 to move from a hopper 33 and into the mower deck interior using a gravity feed. The conduit 31 comprises an elongated, hollow pipe that is sized to receive the ice with minimal interference. The conduit 31 may include a linear design, extending either at an angle or in a vertical direction; or alternatively the conduit 31 may include one or more elbows 39 or turns that are designed to position the hopper 33 in an opportune location for the user based on the geometry of the mower.

In FIGS. 1 and 2, the dispenser assembly 30 is shown in both a close-up view and in a cross-section view for clarity. The hopper 33 comprises an upstanding housing having sidewalls, an interior volume 36, an open upper end 34, and a rim 58 around the open upper end 34. The hopper 33 is one that is configured to hold ice 35, whereby the user is not required to introduce one article of ice at a time but can put the material into the hopper 33 in bulk. The hopper 33 is gravity fed. Gravity moves 99 ice 35 through a lower opening 59 in the hopper 33 and into the conduit 31.

Below the hopper, and connected thereto, is the conduit 31. The conduit 31 includes an open interior 38 and is connected to the lower opening 59 at the relative bottom of the hopper 33. The ice 35 from the hopper 33 can therefore funnel into the conduit interior 38 once introduced into the interior 36 of the hopper. The lower opening 59 of the hopper 33 and the cross-section of the conduit interior 38 are such that the ice 35 can readily enter the lower opening 59 and fall through the conduit 31 with minimal resistance. Gravity moves 99 ice 35 through the conduit 31. The configuration of the dispenser 30 dispenses discrete amounts of ice 35 at one time, typically a single ice 35 cube at a time.

Figure 3A:
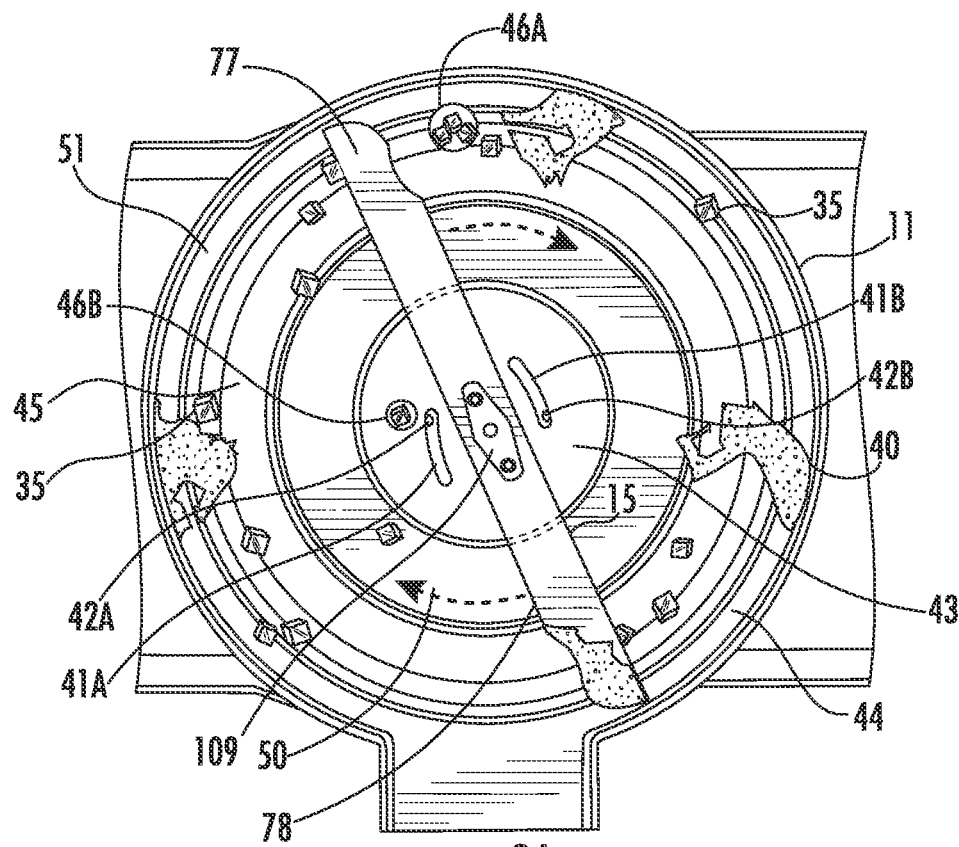
FIG. 3A is bottom view of the lawn mower fitted with the present invention.
Figure 3B:
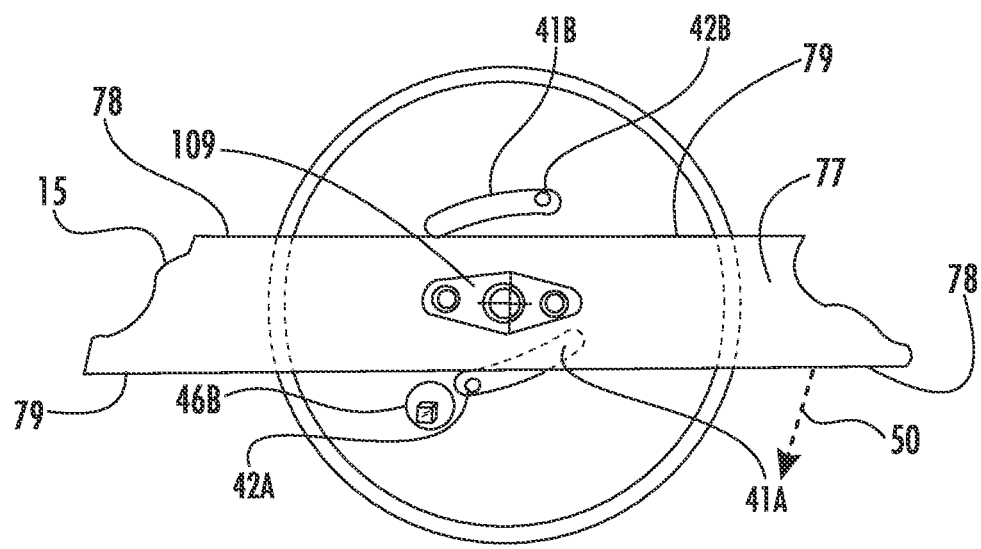
FIG. 3B is an isolation of the rotational sling assembly.

Referring to FIGS. 3A and 3B, there is shown the interior 44 of a typical lawn mower deck 11. The interior 44 has an interior side wall 51 and an interior underside 45. Internally, the junction 32 between the mower deck 11 and the conduit 31 terminates in an aperture 46A, 46B in the mower deck 11. Debris 40, in the form of solid grass clippings 40, adhere to the interior side wall 51, the interior underside 45, and even the lawn mower blade 15, itself. Such debris 40 impairs the performance of the lawn mower.

The mowing blade 15 has a surface 77, two leading edges 78, and two trailing edges 79. The aperture 46 of the dispenser assembly can be positioned near the periphery 46A of the interior underside 45 or the aperture 46B can be placed near the axis of rotation 109.

The apparatus includes a plurality of slingers 41A, 41B mounted to a slinger assembly 43. In this embodiment, two slingers 41A, 41B are used. The slinger assembly 43 is positioned above the moving blade 15 when the mower is oriented with its wheels 14 on the ground. Alternately, the slingers 41A, 41B can be mounted directly to the interior underside 45. The slingers 41A, 41B are free to rotate in a plane that is parallel to the plane of the moving 50 lawn mower blade 15. The slingers 41A, 41B are curve members with a free end, secured only at an axis of rotation 42A, 42B.

When the mower blade 15 is spinning 50 ice 35 is released through an aperture 46. The ice 35 hits the moving 50 blade 15, ricocheting about the interior of the mowing deck 44. The slingers 41A, 41B increase the ricocheting. The combination of the blade 15 and the slingers 41A, 41B result in the ice being pulverized. The energy of the impact between the ice 35 and the mower blade 15 and the slingers 41A, 41B causes the ice to disintegrate and experience a phase change—turning into liquid water. The ice 35 and pulverized ice energetically ricochet into the interior side wall 51 and an interior underside 45, dislodging the debris 40. The apparatus cleans the interior 44 of the mower deck 11 such that the debris 40 is dislodged and the water from the ice cleans the interior side surface 51 and an interior underside 45. Any remaining ice 35 falls to the ground below the mower deck or is jettisoned from the mower deck through a mower deck outlet 16, which can be open or connected to a collection bag.

The method of this invention involves the following steps: introducing ice 35 into a gravity-fed hopper 33; allowing gravity to move the ice 35 through a lower opening in the hopper 33 and into a conduit 31; using gravity to move the ice 35 through the conduit 31 to an aperture 46 in the interior 44 of the mower deck 11; impacting the ice 35 with a moving 50 mower blade 15; ricocheting the ice into at least one of the interior underside 45 of the deck 11, the interior side surface 51, a first rotational slinger 41A, or a second rotational slinger 41B; pulverizing the ice 35 through one or more ricochets; dislodging debris 40 from at least one of the interior side surface 51, the interior underside 45, and the blade 15.

Overall, the present invention provides a means to clean mower decks and the interior surfaces of other rotary machinery using the introduction of ice. Lawn cuttings and other debris often is layered against the interior surfaces of a mower deck, particularly if the mow operation is conducted when the lawn is moist. This layering of debris can impair the performance of the mower, and eventually cause corrosion of its structure. The present invention teaches a new apparatus and method of cleaning the interior surfaces thereof, without the need for a pressure washer and manual cleaning tools. The present invention can clean the interior surfaces while the mower is running, without causing downtime of the mower and without causing additional tasks for the owner. The owner simply introduces the ice into the dispenser assembly, which feeds the material into the mower deck such that the spinning mower blade accelerates the same against the walls of the mower deck. The apparatus and method are suitable for mowers of all types, as well as other dynamic machinery with spinning elements and partially enclosed housing that must be periodically cleaned.

It is submitted that the present invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claimed invention.

I claim:

1. An cleaning apparatus for a lawn mower comprising:
   a gravity-fed dispenser assembly comprised of
      a hopper with an upper opening and a lower opening,
      a conduit having a first end and a second end;
      wherein the first end of the conduit is attached to the lower opening of the hopper;
   an aperture in a lawn mower deck;
   a slinger assembly comprised of
      a plurality of slingers, mounted between a blade of the lawn mower and an interior underside of the lawn mower deck;
      wherein each slinger is a member with one free end and one fixed end;
      wherein each slinger is free to rotate about its fixed end in a plane parallel to the plane of movement for a blade of the lawn mower;
   wherein ice can be placed in the hopper such that a discrete amount of ice will pass through the lower opening, the conduit, and the aperture; and
   wherein, when the lawn mower blade is spinning, the ice having passed through the aperture will impact the lawn mower blade and the plurality of slingers, ultimately impacting at least one of the interior underside of the lawn mower deck and an interior side surface of the lawn mower deck.

2. The cleaning apparatus for a lawn mower of claim 1, wherein impact of ice on the underside of the lawn mower deck will remove debris attached to the underside of the lawn mower deck.

3. The cleaning apparatus for a lawn mower of claim 2, wherein impact of ice on the interior side surface of the lawn mower deck will remove debris attached to the interior side surface of the lawn mower deck.

4. The cleaning apparatus for a lawn mower of claim 3, wherein impact of ice on the lawn mower blade will remove debris attached to the lawn mower blade.

5. The cleaning apparatus for a lawn mower of claim 4, wherein the aperture is in proximity to the periphery of the lawn mower deck.

6. The cleaning apparatus for a lawn mower of claim 4, wherein the aperture is in proximity of the axis of rotation for the lawn mower blade.

7. The cleaning apparatus for a lawn mower of claim 5, wherein the plurality of slingers numbers two.

8. The cleaning apparatus for a lawn mower of claim 6, wherein the plurality of slingers numbers two.

9. The cleaning apparatus for a lawn mower of claim 4, wherein the conduit has at least one bend.

10. A method for cleaning a lawn mower while in use comprising the steps of
    introducing ice into a gravity-fed hopper;
    allowing gravity to move the ice through a lower opening in the hopper and into a conduit;
    using gravity to move the ice through the conduit to an aperture in the interior of the mower deck;
    impacting the ice with a moving mower blade;
    ricocheting the ice into at least one of the interior underside of the deck, the interior side surface, a first rotational slinger, or a second rotational slinger;
    pulverizing the ice through one or more ricochets;
    dislodging debris from at least one of the interior side surface, the interior underside, and the blade.

11. The method for cleaning a lawn mower while in use of claim 10 wherein ice is moved discretely through the lower opening in the hopper, the conduit, and the aperture.

12. The method for cleaning a lawn mower while in use of claim 11, wherein pulverizing the ice converts some of the ice into water.

13. The method for cleaning a lawn mower while in use of claim 12, wherein the water lubricates the interior side surface, the interior underside, and the blade.

\* \* \* \* \*